(12) United States Patent
Bohmer et al.

(10) Patent No.: US 11,840,135 B2
(45) Date of Patent: Dec. 12, 2023

(54) BATTERY PACK SUPPORT ASSEMBLY FOR ELECTRIC VEHICLE

(71) Applicant: Ford Global Technologies, LLC, Dearborn, MI (US)

(72) Inventors: Jeffrey Ronald Bohmer, Monroe, MI (US); Alexander Thomas Arena, Canton, MI (US); Hari Krishna Addanki, Novi, MI (US); Kevin A. Montgomery, Royal Oak, MI (US); Ajay Kumar Gupta, Troy, MI (US); Yulie Liu, Canton, MI (US); Henry W. Hausler, New Hudson, MI (US); John Wesley Stanley, Belleville, MI (US); Eric Layton Stratten, Plymouth, MI (US); Phil Lenius, Commerce Township, MI (US); Carl Montgomery, Madison Heights, MI (US); Erik Billimoria, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 137 days.

(21) Appl. No.: 17/393,026

(22) Filed: Aug. 3, 2021

(65) Prior Publication Data
US 2023/0044178 A1 Feb. 9, 2023

(51) Int. Cl.
*B60K 1/04* (2019.01)
*H01M 50/249* (2021.01)
(Continued)

(52) U.S. Cl.
CPC ............. *B60K 1/04* (2013.01); *H01M 50/242* (2021.01); *H01M 50/249* (2021.01); *H01M 50/262* (2021.01); *H01M 2220/20* (2013.01)

(58) Field of Classification Search
CPC .... B60K 1/04; H01M 50/242; H01M 50/249; H01M 50/262; H01M 2220/20
See application file for complete search history.

(56) References Cited

U.S. PATENT DOCUMENTS 5,464,266 A * 11/1995 Guertler ................. B60R 19/42
293/109
6,158,726 A * 12/2000 Coleman .................. F16F 1/44
267/140

(Continued)

FOREIGN PATENT DOCUMENTS

DE 102012017879 3/2014
DE 102018206118 10/2019
JP 107323737 12/1995

*Primary Examiner* — James A English
*Assistant Examiner* — James J Triggs
(74) *Attorney, Agent, or Firm* — Burris Law, PLLC

(57) ABSTRACT

A battery pack support assembly includes a plurality of isolators disposed between an outer support frame of a battery pack and longitudinal rails of a vehicle frame. Each isolator includes a housing, an elastic body and a fastener. The housing defines a central opening and opposed flanges. The opposed flanges are secured to a respective longitudinal rail. The elastic body is disposed within the central opening of the housing. The fastener extends laterally through the central opening of the housing and secures the elastic body to the outer support frame of the battery pack.

20 Claims, 5 Drawing Sheets

(51) Int. Cl.
*H01M 50/262* (2021.01)
*H01M 50/242* (2021.01)

(56) References Cited

U.S. PATENT DOCUMENTS

| | | | |
|---|---|---|---|
| 10,468,645 B2 * | 11/2019 | Jackson | H01M 10/613 |
| 10,494,030 B1 | 12/2019 | Paramasivam et al. | |
| 11,059,363 B2 * | 7/2021 | Kober | B60K 1/04 |
| 2010/0216004 A1 * | 8/2010 | Yoon | H01M 10/625 |
| | | | 429/120 |

* cited by examiner

BATTERY PACK SUPPORT ASSEMBLY FOR ELECTRIC VEHICLE

FIELD

The present disclosure relates to a battery pack support assembly for an electric vehicle.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location relative to the electric vehicle, the battery pack may be susceptible to various vehicle loads.

Integration of rechargeable battery packs into the structure of existing vehicles and providing efficient load paths in a variety of operating conditions can be challenging, primarily due to the increased weight of the battery packs and their larger footprint in the vehicle. The present disclosure addresses these issues related to the integration of rechargeable battery packs in electric vehicles.

SUMMARY

This section provides a general summary of the disclosure and is not a comprehensive disclosure of its full scope or all of its features.

In one form, the present disclosure provides a battery pack support assembly for mounting a battery pack to a vehicle frame. The battery pack has an outer support frame and the vehicle frame has opposed longitudinal rails. The battery pack support assembly includes a plurality of isolators disposed between the outer support frame of the battery pack and each of the longitudinal rails. Each isolator includes a housing, an elastic body, and a fastener. The housing defines a central opening and opposed flanges. The opposed flanges are secured to a respective longitudinal rail. The elastic body is disposed within the central opening. The fastener extends laterally through the central opening of the housing and secures the elastic body to the outer support frame of the battery pack.

In variations of the battery pack support assembly, which may be implemented individually or in any combination: a plurality of brackets are disposed between the plurality of isolators; each bracket is secured to adjacent flanges of two isolators and to a respective longitudinal rail; a plurality of lateral support members extend between the opposed longitudinal rails; each of the lateral support members is secured to a corresponding bracket; each bracket comprises a lower flange secured to the adjacent flanges of the isolators and a return flange secured to the respective longitudinal rail; the plurality of brackets and the plurality of housings of the isolators are combined into a unitized structure; the central opening defines a cylindrical geometry; jounce bumpers are disposed proximate and below each corner of the battery pack; the isolators are evenly spaced along a length of the longitudinal rails; the plurality of isolators are longitudinally aligned with each other; the elastic body comprises an elastomeric material; and the housing is made of an aluminum material.

In another form, the present disclosure provides a battery pack support assembly for mounting a battery pack to a vehicle frame. The battery pack has an outer support frame and the vehicle frame has opposed longitudinal rails. The battery pack support assembly includes a plurality of isolators and a plurality of brackets. The isolators are disposed between the outer support frame of the battery pack and each of the longitudinal rails. Each isolator includes a housing, an elastic body, and a fastener. The housing includes a cylindrical portion and opposed flanges. The cylindrical portion defines a central opening. The opposed flanges are secured to a respective longitudinal rail. The elastic body is disposed within the central opening. The fastener extends laterally through the central opening of the housing and secures the elastic body to the outer support frame of the battery pack. The plurality of brackets are disposed between the plurality of isolators. Each bracket is secured to adjacent flanges of two isolators and to a respective longitudinal rail.

In variations of this battery pack support assembly, which may be implemented individually or in any combination: each bracket comprises a lower flange secured to the adjacent flanges of the isolators and a return flange secured to the respective longitudinal rail; the isolators are evenly spaced along a length of the longitudinal rails; the elastic body comprises an elastomeric material; and the isolators are longitudinally aligned with each other.

In yet another form, the present disclosure provides an electric vehicle that includes a battery pack, a vehicle frame, a first set of isolators, and a second set of isolators. The battery pack has an outer support frame. The vehicle frame supports the battery pack and has opposed longitudinal rails. The first set of isolators are disposed between the outer support frame of the battery pack and one rail of the opposed longitudinal rails. The second set of isolators are disposed between the outer support frame of the battery pack and an opposed rail of the opposed longitudinal rails. Each isolator includes a housing, an elastic body, and a fastener. The housing defines a central opening and opposed flanges. The opposed flanges is secured to one rail of the opposed longitudinal rails. The elastic body is disposed within the central opening. The fastener extends laterally through the central opening of the housing and secures the elastic body to the outer support frame of the battery pack.

In variations of the electric vehicle, which may be implemented individually or in any combination: the first set of isolators are evenly spaced along a length of the longitudinal rails and the second set of isolators are evenly spaced along the length of the longitudinal rails; the elastic bodies comprise an elastomeric material; and the first set of isolators are longitudinally aligned with each other and the second set of isolators are longitudinally aligned with each other.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
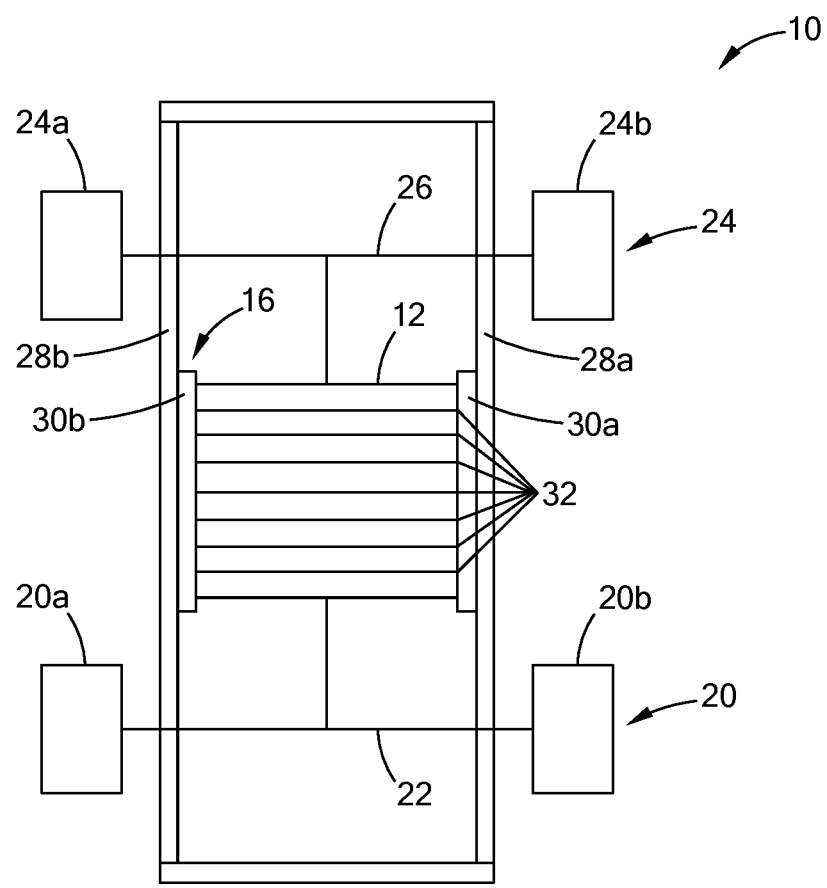
FIG. 1 is a schematic view of a vehicle including a battery pack support assembly according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
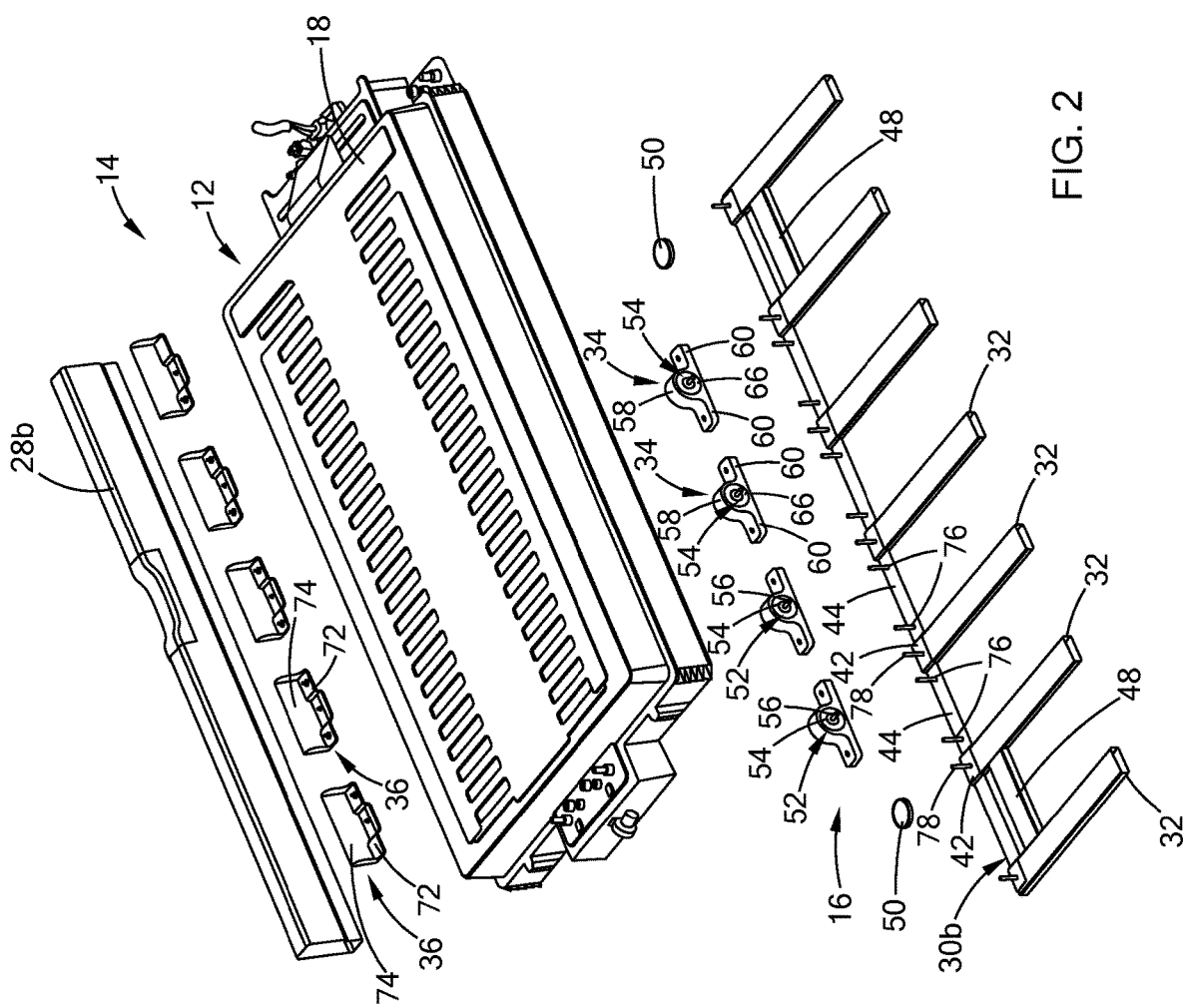
FIG. 2 is an exploded view of a portion of the battery pack support assembly of FIG. 1.

With reference to FIGS. 1 and 2, a vehicle 10 (FIG. 1) such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. The vehicle 10 includes a battery pack 12, a vehicle frame 14 (FIG. 2) and a battery pack support assembly 16 (FIG. 2). The battery pack 12 may be rechargeable and may include lithium-ion batteries or any other suitable electrical power storage units. The battery pack 12 may be disposed at various locations of the vehicle 10 and may be mounted to the vehicle frame 14 via the battery pack support assembly 16. In this way, the battery pack 12 is supported by the vehicle frame 14 and is remote from a passenger cabin (not shown) and cargo compartments (not shown) of the vehicle 10, therefore, not occupying space that would otherwise be available for passengers or cargo. The battery pack 12 includes an outer support frame 18. The battery pack 12 powers a rear motor (not shown) to drive rear wheels 20a, 20b of a set of rear wheels 20 via a rear axle 22. Similarly, the battery pack 12 powers a front motor (not shown) to drive front wheels 24a, 24b of a set of front wheels 24 via a front axle 26.

The vehicle frame 14 is the main supporting structure of the vehicle 10, to which various components are attached either directly or indirectly. The vehicle frame 14 includes opposed longitudinal rails 28a, 28b. The rails 28a, 28b are spaced apart from each other and may establish a length of the vehicle frame 14.

The battery pack support assembly 16 includes opposed longitudinal side frames 30a, 30b (FIG. 1), a plurality of lateral support members 32, a plurality of first isolators 34, a plurality of first brackets 36, a plurality of second of isolators (not shown), and a plurality of second brackets (not shown). The opposed side frames 30a, 30b are spaced apart from each other and are located between the rails 28a, 28b. The side frame 30a is located between a first side of the battery pack 12 and the rail 28a, and the side frame 30b is located between an opposed second side of the battery pack 12 and the rail 28b. As shown best in FIG. 2, each side frame 30a, 30b includes bracket mounting sections 42 and isolator mounting sections 44 that are arranged in an alternating fashion along a length of the side frame 30a, 30b. The bracket mounting sections 42 are located above the isolator mounting sections 44. Stated differently, a plane extending along a surface of each bracket mounting sections 42 is above a plane extending along a surface of each isolator mounting sections 44.

The plurality of lateral support members 32 are evenly spaced apart from each other along a longitudinal direction of the vehicle 10 and extend transversely relative to and between the opposed side frames 30a, 30b. The plurality of lateral support members 32 also extend underneath the battery pack 12 and are spaced apart from the battery pack 12. Each lateral support member 32 includes opposed ends.

Figure 3:
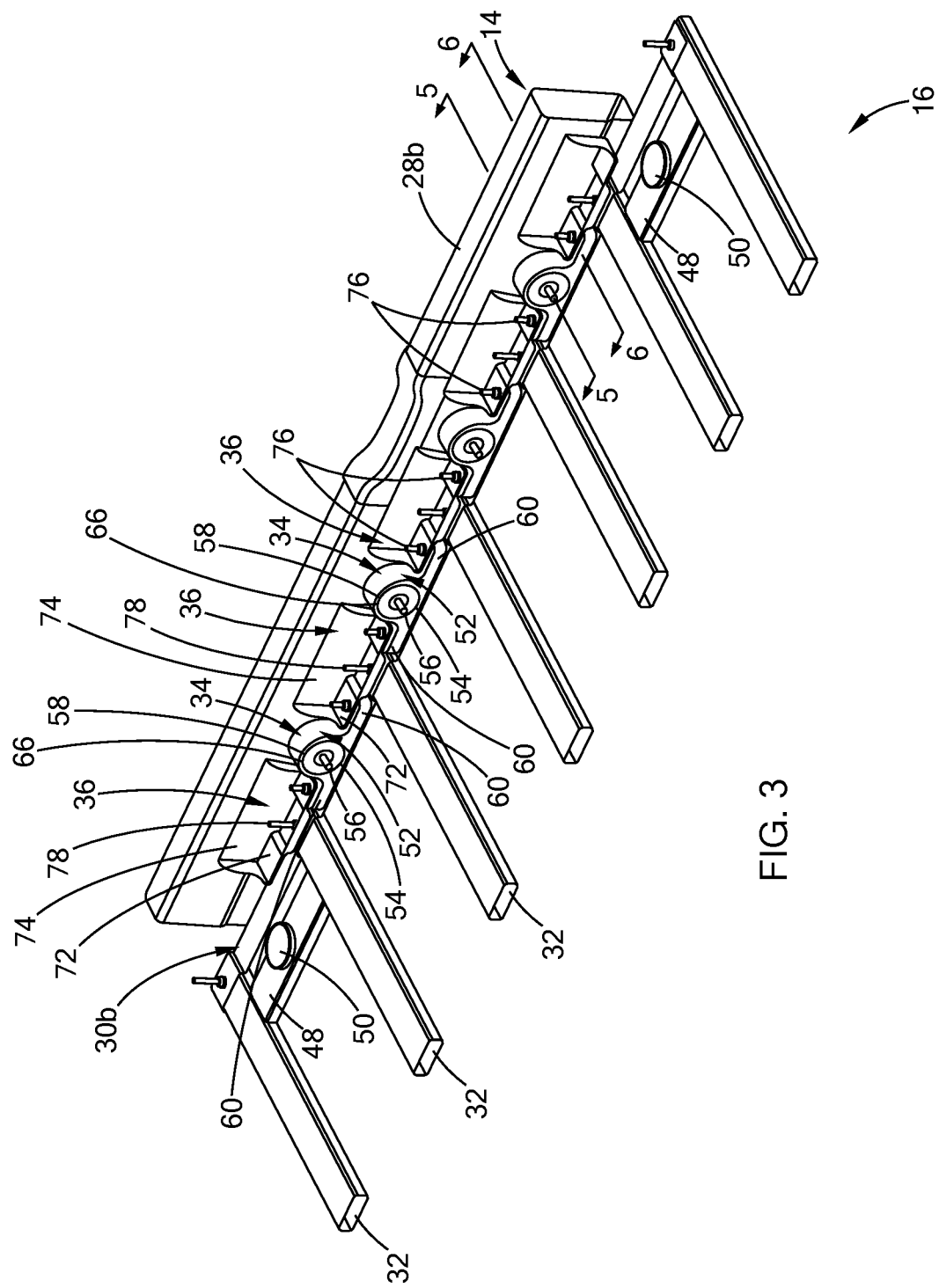
FIG. 3 is a perspective view of a portion of the battery pack support assembly of FIG. 1.
Figure 4:
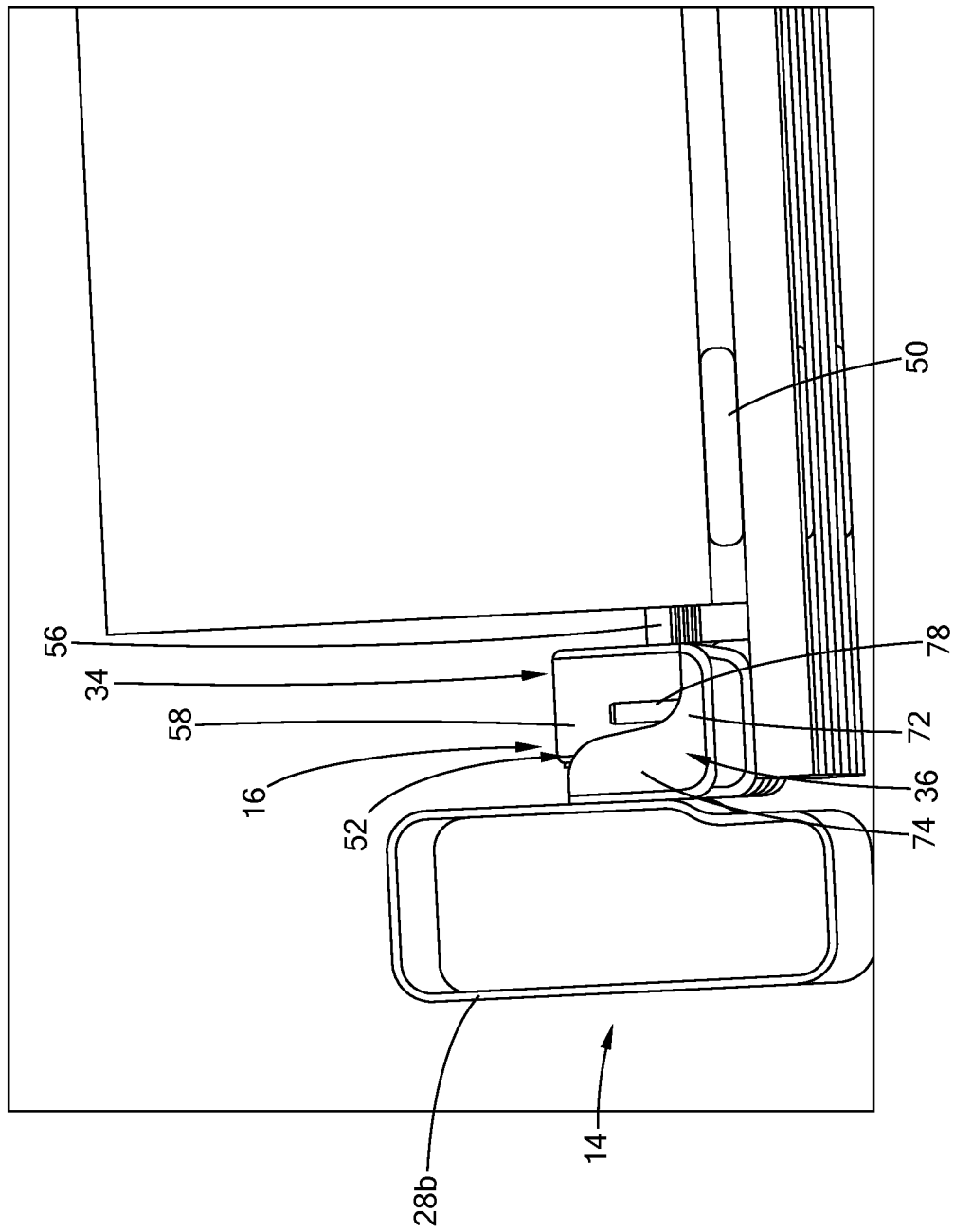
FIG. 4 is an enlarged perspective view of a portion of the battery pack support assembly of FIG. 1.

As shown in FIGS. 2 and 3, an intermediate support member 48 is secured to and extends between two lateral support members 32 at a respective corner of the battery pack 12. Each intermediate support member 48 is spaced apart from the battery pack 12 and is secured to the two lateral support members 32 via welding. In other examples, each intermediate support member 48 may be secured to the two lateral support members 32 via mechanical fasteners or any other suitable attachment means. Jounce bumpers 50 are disposed on a respective intermediate support member 48 such that the jounce bumpers 50 are proximate and below each corner of the battery pack 12.

With reference to FIGS. 3 through 6, the plurality of first isolators 34 are adapted to dampen energy transmitted to the vehicle frame 14 and/or the outer support frame 18 of the battery pack 12. The plurality of first isolators 34 are disposed between the outer support frame 18 of the battery pack 12 and the rail 28b, and are evenly spaced apart along a length of the longitudinal rails 28a, 28b. The plurality of first isolators 34 are also longitudinally aligned with each other. Each first isolator 34 is horizontally aligned with a respective second isolator (not shown) and includes a housing 52, a bushing 54 and a fastener 56. The housing 52 is made of a metal material such as aluminum and is mounted to a respective isolator mounting section 44 of the side frame 30b. The housing 52 includes a cylindrical portion 58 and opposed flanges 60. The cylindrical portion 58 is located between the opposed flanges 60 and defines a central opening.

Figure 5:
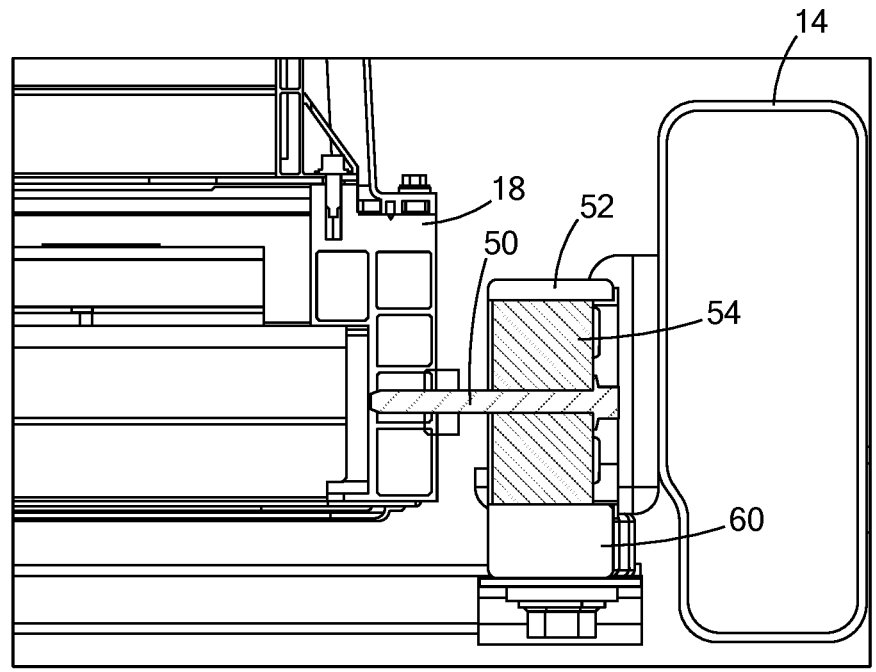
FIG. 5 is a cross-sectional view taken along line 5-5 of FIG. 3.

With reference to FIGS. 2 and 3, and also FIG. 5, the bushing 54 is press-fit within the central opening of the cylindrical portion 58 of the housing 52. The bushing 54 is mechanically coupled to the outer support frame 18 of the battery pack 12 and includes an inner sleeve (not shown), an elastic body 66, and an outer sleeve (not shown). The inner sleeve is cylindrical shape and is made of a metal material. The inner sleeve is attached to (e.g., press-fitted) the elastic body 66 and defines an opening extending therethrough.

The elastic body 66 may be bonded to and molded into the inner sleeve and may be a cylindrical shape. The elastic body 66 is also disposed between the inner sleeve and the outer sleeve. The elastic body 66 deforms elastically when a force or load is applied to the elastic body 66 and returns to its original shape once the force or load is removed from the elastic body 66. In the example provided, the elastic body 66 is made of an elastomeric material such as polyurethane, silicones, or a rubber, for example. In other examples, the elastic body 66 may be a spring or other component that undergoes elastic deformation when a load or force is applied.

In one form, the outer sleeve is a cylindrical shape and is made of a metal material. The outer sleeve may be press-fit onto the elastic body 66 such that the outer sleeve houses the elastic body 66 and the inner sleeve. The outer sleeve is also attached to the housing 52. For example, the outer sleeve may be press-fit into the central opening of the housing 52. The fastener 56 extends laterally through the opening of the inner sleeve and at least partially through the outer support frame 18 of the battery pack 12 to secure the bushing 54 and the battery pack 12 to each other. In one example, threads of the fastener 56 engages threads of the outer support frame 18 to secure the bushing 54 and the battery pack 12 to each other. The fastener 56 may be a screw or a bolt, for example.

Figure 6:
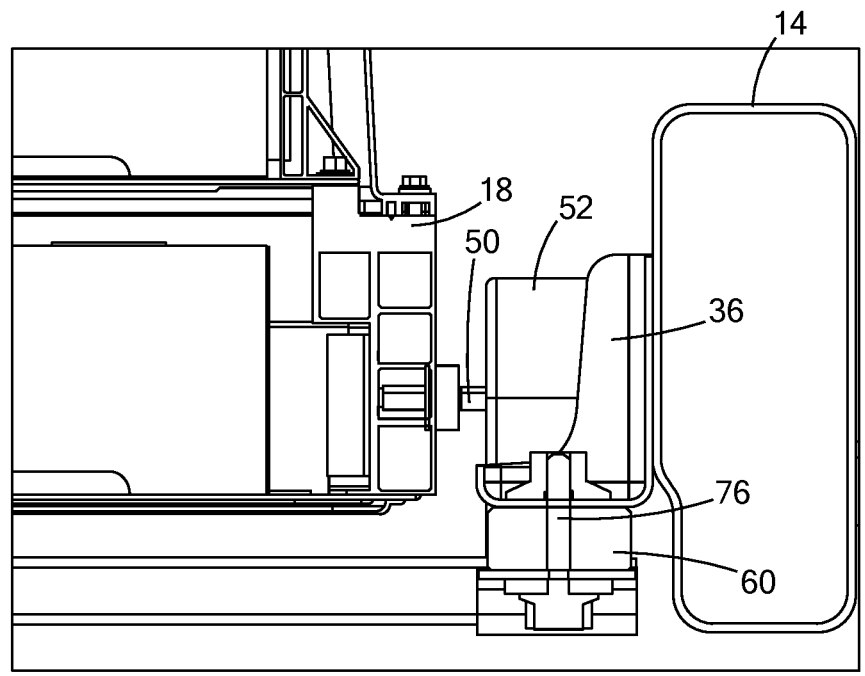
FIG. 6 is a cross-sectional view taken along line 6-6 of FIG. 3.

With reference to FIGS. 2 and 3, and also FIG. 6, the plurality of first brackets 36 are disposed between the plurality of first isolators 34 so that the first brackets 36 and the first isolators 34 are arranged in an alternating fashion along the length of the longitudinal rails 28a, 28b. In an alternate form, the housings 52 of the first isolators 34 and the first brackets 36 may be combined into a unitized structure, thereby reducing parts of the battery pack support assembly 16. Each first bracket 36 is L-shaped and may be made of a metal material such as aluminum. Each first bracket 36 includes a lower flange 72 and a return flange 74 that extends perpendicular to the lower flange 72.

The lower flange 72 is positioned on and secured to adjacent flanges 60 of two first isolators 34. That is, a fastener 76 extends vertically through a respective isolator mounting section 44 of the side frame 30b, a respective adjacent flange 60, and the lower flange 72, thereby mechanically coupling the first bracket 36, the side frame 30b, and the first isolators 34 to each other. In an alternative example, the lower flange 72 may be welded to the adjacent flanges 60 and the adjacent flanges 60 may be welded to the side frame 30b. It should be understood that the foremost bracket 36 and the rearmost bracket 36 may be secured to only one isolator 34. A fastener 78 extends vertically through a respective lateral support member 32, a respective bracket mounting section 42 of the side frame 30b and the lower flange 72, thereby mechanically coupling the lower flange 72, the respective lateral support member 32, and the side frame 30b to each other. The return flange 74 is welded to the longitudinal rail 28b, thereby securing the first isolators 34 to the longitudinal rail 28b. In another form, the return flange 74 may be mechanically coupled to the longitudinal rail 28b.

The plurality of second isolators (not shown) are disposed between the outer support frame 18 of the battery pack 12 and the rail 28a, and are evenly spaced apart along the length of the longitudinal rails 28a, 28b. The structure and function of the second isolators may be similar or identical to the first isolators 34 described above, and therefore, will not be described again in detail. The plurality of second brackets (not shown) are disposed between the plurality of second isolators so that the second brackets and the second isolators are arranged in an alternating fashion along the length of the longitudinal rails 28a, 28b. The structure and function of the second brackets may be similar or identical to the first brackets 36 described above, and therefore, will not be described again in detail.

The battery pack support assembly 16 of the present disclosure provides the benefit of securing the battery pack 12 to the opposed longitudinal rails 28a, 28b instead of being placed on the lateral support members. This, in turn, allows the weight of the battery pack 12 to be directly transferred to the vehicle frame 14, which improves mount durability. This also allows for efficiencies in overall vehicle height, which benefits long range battery electric vehicles. The isolators 34 being mounted on sides of the outer support frame 18 of the battery pack 12 between the outer support frame 18 of the battery pack 12 and each longitudinal rails 28a, 28b inhibits bending and/or twisting loads on the frame 14 from being transferred to the battery pack 12. This also provides additional strength to the vehicle frame 14 to resist bending and/or twisting.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery pack support assembly for mounting a battery pack to a vehicle frame, the battery pack having an outer support frame and the vehicle frame having opposed longitudinal rails, the battery pack support assembly comprising:
    a plurality of isolators mounted on an inboard wall of each of the longitudinal rails, each isolator comprising:
        a unitized housing including a body portion defining a central opening and opposed flanges, the opposed flanges being secured to a respective longitudinal rail;
        an elastic body fixed within the central opening of the unitized housing; and
        a fastener extending laterally through the central opening of the unitized housing and securing the elastic body to the outer support frame of the battery pack.

2. The battery pack support assembly according to claim 1, further comprising a plurality of brackets disposed between the plurality of isolators, each bracket being secured to flanges of two adjacent isolators and to a respective longitudinal rail.

3. The battery pack support assembly according to claim 2, further comprising a plurality of lateral support members extending between the opposed longitudinal rails, each of the lateral support members being secured to a corresponding bracket of the plurality of brackets.

4. The battery pack support assembly according to claim 2, wherein each bracket comprises a lower flange secured to the flanges of the two adjacent isolators and a return flange secured to the respective longitudinal rail.

5. The battery pack support assembly according to claim 2, wherein the plurality of brackets and the plurality of housings of the isolators are combined into a unitized structure.

6. The battery pack support assembly according to claim 1, wherein the central opening defines a cylindrical geometry.

7. The battery pack support assembly according to claim 1, further comprising jounce bumpers disposed proximate and below each corner of the battery pack.

8. The battery pack support assembly according to claim 1, wherein the isolators are evenly spaced along a length of the longitudinal rails.

9. The battery pack support assembly according to claim 1, where the plurality of isolators are longitudinally aligned with each other.

10. The battery pack support assembly according to claim 1, wherein the elastic body comprises an elastomer.

11. The battery pack support assembly according to claim 1, wherein the unitized housing is made of an aluminum.

12. A battery pack support assembly for mounting a battery pack to a vehicle frame, the battery pack having an outer support frame and the vehicle frame having opposed longitudinal rails, the battery pack support assembly comprising:
  a plurality of isolators mounted on an inboard wall of each of the longitudinal rails, each isolator comprising:
    a unitized housing including a cylindrical portion and opposed flanges, the cylindrical portion defining a central opening, the opposed flanges being secured to a respective longitudinal rail;
    an elastic body fixed within the central opening of the unitized housing; and
    a fastener extending laterally through the central opening of the unitized housing and securing the elastic body to the outer support frame of the battery pack; and
  a plurality of brackets disposed between the plurality of isolators, each bracket being secured to flanges of two adjacent isolators and to a respective longitudinal rail.

13. The battery pack support assembly according to claim 12, wherein each bracket comprises a lower flange secured to the flanges of the two adjacent isolators and a return flange secured to the respective longitudinal rail.

14. The battery pack support assembly according to claim 12, wherein the isolators are evenly spaced along a length of the longitudinal rails.

15. The battery pack support assembly according to claim 12, wherein the elastic body comprises an elastomer.

16. The battery pack support assembly according to claim 12, wherein the isolators are longitudinally aligned with each other.

17. An electric vehicle comprising:
  a battery pack having an outer support frame;
  a vehicle frame supporting the battery pack and having opposed longitudinal rails;
  a first set of isolators mounted on an inboard wall of one rail of the opposed longitudinal rails; and
  a second set of isolators mounted on an inboard wall of an opposed rail of the opposed longitudinal rails, each of the first and second sets of isolators comprising:
    a unitized housing including a body portion defining a central opening and opposed flanges, the opposed flanges being secured to one rail of the opposed longitudinal rails;
    an elastic body fixed within the central opening of the unitized housing; and
    a fastener extending laterally through the central opening of the unitized housing and securing the elastic body to the outer support frame of the battery pack.

18. The electric vehicle according to claim 17, wherein the first set of isolators are evenly spaced along a length of the longitudinal rails and the second set of isolators are evenly spaced along the length of the longitudinal rails.

19. The electric vehicle according to claim 17, wherein the elastic bodies comprise an elastomer.

20. The electric vehicle according to claim 17, wherein the first set of isolators are longitudinally aligned with each other and the second set of isolators are longitudinally aligned with each other.

\* \* \* \* \*